Patented Sept. 13, 1932

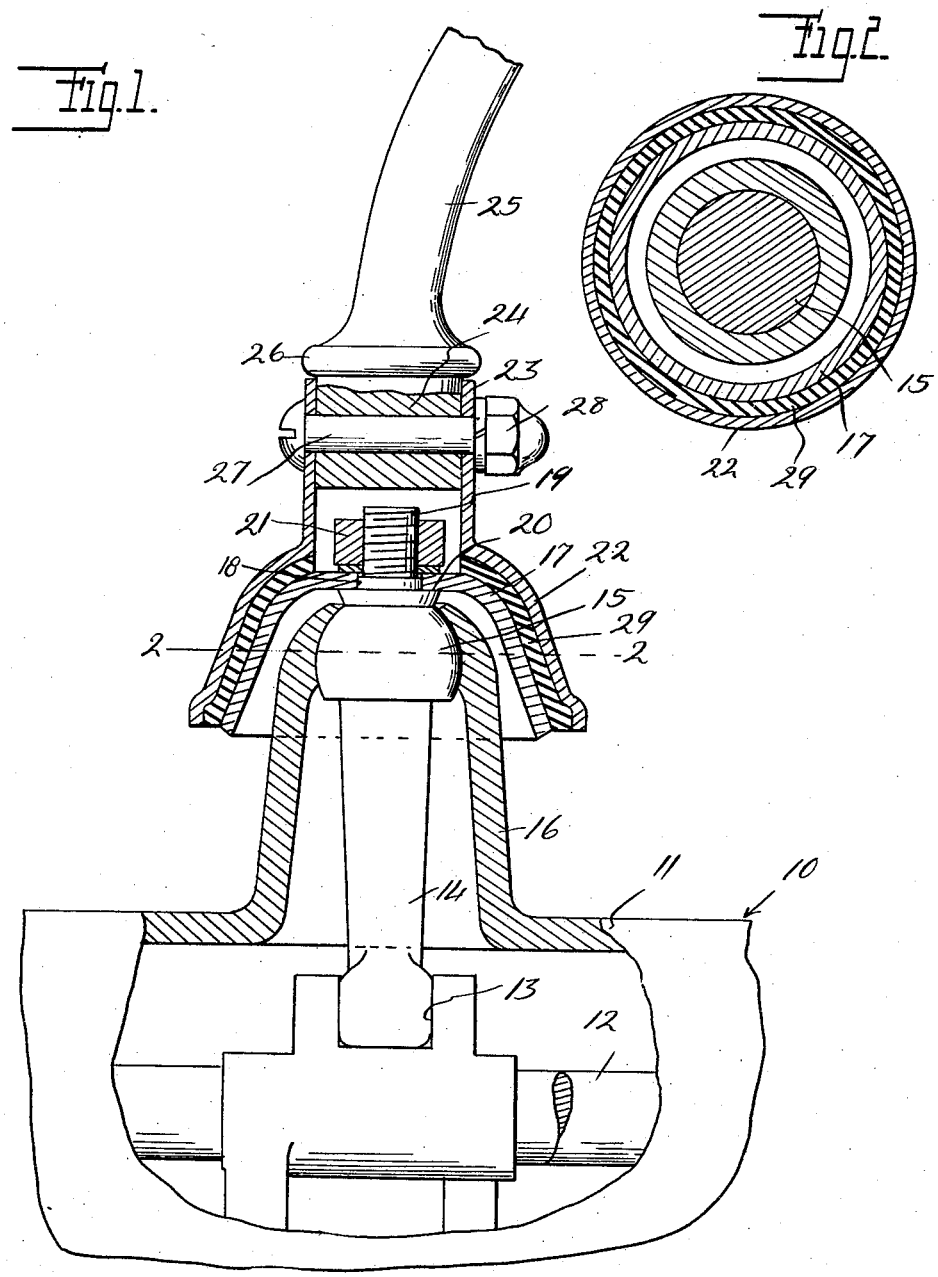

1,876,709

UNITED STATES PATENT OFFICE

EARLE S. MacPHERSON, OF DETROIT, MICHIGAN, ASSIGNOR TO HUPP MOTOR CAR CORPORATION, OF DETROIT, MICHIGAN, A CORPORATION OF VIRGINIA

CONTROL LEVER

Application filed July 7, 1930. Serial No. 466,205.

This invention relates generally to vehicles and refers more particularly to improvements in control levers especially designed for use in connection with variable speed transmissions for actuating the same.

One of the principal objects of this invention is to provide a transmission control lever so constructed as to absorb the vibrations set up in the transmission and also the shocks resulting from movement of the gears into mesh prior to the same being transmitted to the upper or gripping portions of the control lever.

Another advantageous feature of this invention resides in the provision of a control lever of the type specified above formed of a plurality of axially spaced parts having resilient non-metallic means interposed therebetween which in addition to absorbing vibrations and other objectionable shocks set up in the transmission, also serves to secure the parts together and is so designed as to prevent relative rotation thereof.

With the foregoing as well as other objects in view, the invention resides in the peculiar construction of the control lever which will be made more apparent as this description proceeds, especially when considered in connection with the accompanying drawing, wherein:

Figure 1 is a fragmentary cross-sectional view through a transmission having a control lever associated therewith constructed in accordance with this invention.

Figure 2 is a sectional view taken substantially on the plane indicated by the line 2—2 of Figure 1.

Referring now to the drawing, it will be noted that there is illustrated in Figure 1 a transmission assembly 10 preferably of the conventional selective speed type comprising a casing 11 enclosing the change speed gears (not shown) and having a plurality of shifter rails 12 mounted therein for axial sliding movement. The shifter rails 12 are preferably operatively connected to the slidable gears in the transmission in accordance with the usual practice and are provided with opposed recesses 13 for receiving the lower end of the actuating lever 14. The upper end of the lever 14 terminates in a spherical portion or ball 15 adapted to be mounted within the upper end of the transmission tower 16. As shown particularly in Figure 1, the upper end portion of the tower 16 is shaped to correspond to the surface of the ball and engages the same permitting universal movement of the lever 14 relative to the tower for selectively reciprocating the rails 13 to actuate the gears in the transmission.

For effecting a rocking movement of the lever 14 to engage the same with either of the rails 13, I provide a bell-shaped member 17 having an interior diameter sufficient to receive the upper portion of the tower 16 and having a polygonally-shaped opening 18 in the base thereof adapted to receive a correspondingly-shaped portion on the stud 19 formed integral with and extending upwardly from the ball 15. As will be observed from Figure 1, the stud 19 is provided with a shoulder 20 upon which the bell 17 is clamped by means of a suitable nut 21 threadedly mounted on the upper portion of the stud and engageable with the bell. Surrounding the bell-shaped member 17 in spaced relation thereto is a second bell-shaped member 22 terminating at the upper end thereof in a sleeve-like portion 23 of sufficient diameter to receive the lower end 24 of the control lever 25. The portion 24 of the control lever terminates short of the stud 19 and is provided with an annular shoulder 26 engageable with the upper edge of the sleeve 23 to limit downward movement of the control lever relative to the sleeve-like portion 23. The control lever is rigidly secured to the sleeve-like portion 23 of the bell 22 by means of a bolt 27 extending transversely through the sleeve portion 23 and lower portion 24 of the control lever and adapted to threadedly receive a suitable clamping nut 28.

In order to provide an operative connection between the bell-shaped members 17 and 22 and at the same time insulate the latter member from the former, I provide a third bell-shaped member 29 formed of rubber or rubber composition and adapted to be interposed within the space between the bell-shaped members 17 and 22 and vulcanized to the same. By vulcanizing the rubber bell-shaped member 29 to both of the bell-shaped members 17 and 22, the latter form a unitary construction and are thoroughly insulated from metallic contact with each other. The arrangement is such that any vibration set up in the transmission or any shock resulting from shifting the gears into mesh within the transmission will be absorbed by the rubber bell-shaped member 29 prior to the same being transmitted to the control lever 25. As a consequence, the control lever 25 is prevented from vibration and moreover, is prevented from rotational movement relative to the transmission tower since the area of the rubber mounting is sufficient to resist twisting movement of the lever.

What I claim as my invention is:

A transmission control lever formed of a plurality of axially spaced parts, a bell-shaped member secured to one of said parts adjacent one end thereof, a second substantially bell-shaped member secured to the adjacent end of another of said parts and encircling the bell-shaped member aforesaid in spaced relation thereto, and a correspondingly shaped element formed of resilient non-metallic material interposed between the bell-shaped members aforesaid and secured thereto for fastening the two parts together and for insulating the same from metallic contact with each other.

In testimony whereof I affix my signature.

EARLE S. MacPHERSON.